(12) United States Patent
Beyer et al.

(10) Patent No.: US 8,245,953 B2
(45) Date of Patent: Aug. 21, 2012

(54) ADJUSTABLY MOUNTED SPRAY NOZZLE FOR WINDSHIELD WASHER FLUID OF A MOTOR VEHICLE

(75) Inventors: Matthias Beyer, Böblingen (DE); Horst Stickel, Böblingen (DE); Jürgen Sporer, Schönwald (DE); Daniel Utz, Bad Bellingen (DE); Peter Zielke, Adorf/V (DE)

(73) Assignee: Rehau AG & Co., Rehau (DE)

( * ) Notice: Subject to any disclaimer, the term of this patent is extended or adjusted under 35 U.S.C. 154(b) by 1369 days.

(21) Appl. No.: 10/599,847

(22) PCT Filed: Feb. 26, 2005

(86) PCT No.: PCT/DE2005/000328
§ 371 (c)(1),
(2), (4) Date: Sep. 21, 2007

(87) PCT Pub. No.: WO2005/100108
PCT Pub. Date: Oct. 27, 2005

(65) Prior Publication Data
US 2011/0101127 A1 May 5, 2011

(30) Foreign Application Priority Data
Apr. 16, 2004 (DE) .......................... 10 2004 018 607

(51) Int. Cl.
*B05B 1/10* (2006.01)

(52) U.S. Cl. .................. 239/284.1; 239/284.2

(58) Field of Classification Search ............... 239/284.1, 239/284.2; 15/250.002, 250.01–250.05; 134/186, 191, 193, 198
See application file for complete search history.

(56) References Cited

U.S. PATENT DOCUMENTS

| 3,008,649 | A | * | 11/1961 | Bock et al. ................. 239/284.1 |
| 6,050,503 | A |   | 4/2000  | Suhring et al. |
| 6,951,223 | B2 | * | 10/2005 | Fukushima ................... 134/186 |
| 2003/0066907 | A1 | * | 4/2003 | Drouillard ................ 239/284.1 |

FOREIGN PATENT DOCUMENTS

| DE | 4305245  | 8/1994  |
| DE | 4338685  | 9/1995  |
| DE | 19746059 | 4/1999  |
| DE | 19958196 | 6/2001  |
| DE | 19641460 | 8/2002  |
| DE | 10246979 | 4/2004  |
| EP | 1106456  | 8/2005  |
| FR | 2677938  | 12/1992 |
| JP | 62175242 | 7/1987  |

* cited by examiner

*Primary Examiner* — Davis Hwu
(74) *Attorney, Agent, or Firm* — Faegre Baker Daniels

(57) ABSTRACT

An adjustably mounted spray nozzle (4) for windshield washer fluid of a motor vehicle is designed to be easy to install and adjust. To this end, the spray nozzle (4) has the following features: it has a bearing axis (7) by means of which it can be attached to a vehicle in a manner that enables it to pivot about a y-axis of said vehicle; the spray nozzle (4) is provided with an adjusting-means element for pivoting about its bearing axis (7); the adjusting-means element is designed to cooperate with an adjusting-drive manipulator.

14 Claims, 2 Drawing Sheets

ADJUSTABLY MOUNTED SPRAY NOZZLE FOR WINDSHIELD WASHER FLUID OF A MOTOR VEHICLE

BACKGROUND OF THE INVENTION

1. Background of the Invention

The invention concerns an adjustably mounted spray nozzle for windshield washer fluid of a motor vehicle.

2. Description of the Related Art

In connection with spray nozzles of this kind, which, for example as taught by DE 43 38 685 C1, are disposed in a channel located below a windshield in a manner relatively hidden from external view, a problem that is addressed by the invention lies in the ability to adjust this spray nozzle as easily as possible from outside the channel in order to change the orientation of its spray jet.

This problem is solved by the spray nozzle of the present invention.

SUMMARY OF THE INVENTION

The invention is based on the general idea of creating a spray nozzle and mounting it in a receiving element in such a way as to produce a ready-to-use mounting which, once installed, can no longer be recalibrated or adjusted in the x- and y-directions of the vehicle. The only thing that can be recalibrated or adjusted at that time is the direction of the spray jet with respect to a z-plane perpendicular to the bearing axis. To gain this calibrating or adjusting capability, a pivot bearing is provided in a y-axis of the vehicle inside the receiving element. The receiving element can be a fairing disposed in front of and facing a vehicle windshield, in a channel located anteriorly of the bottom end thereof. The fairing as a whole forms a cavity in which the spray nozzle is pivotably mounted according to the invention. The bearings in which the spray nozzle is pivotably mounted are configured as snap-in or push-in bearings. This means that the bearings are easy to assemble. The bearing axis of the spray nozzle simultaneously comprises connection pieces for feeding washer fluid into the nozzle or feeding a fluid through the spray nozzle to an optional additional spray nozzle.

The spray nozzle is pivoted by means of an adjusting drive comprising an abutment fixedly provided at the spray nozzle and an adjusting-drive manipulator that cooperates with the abutment. The adjusting-drive manipulator is adjustably mounted in the receiving element of the spray nozzle. The adjusting drive can be for example a threaded spindle drive. The adjusting-drive manipulator is then the threaded spindle, provided with a handwheel.

The spray nozzle, including its adjusting drive, is mounted inside the receiving element in such a way that the only connection to the outside is through a first and a second opening in the receiving element constituted by the fairing part. At least one jet of washer fluid from the spray nozzle is able to pass through the first opening to an assigned pane to be sprayed. The second opening is used to operate the handwheel of the threaded spindle of the spray-nozzle adjusting drive. The threaded spindle drive can be implemented with a self-lock mechanism to keep it from adjusting on its own.

Any other adjusting drive can be used in place of the threaded spindle drive. The only prerequisite is that it be possible to make an adjustment quickly and easily from outside the fairing part and that the adjusted position of the spray nozzle not be able to change on its own. Like the spray nozzle itself, the adjusting-drive handwheel, for example the threaded spindle equipped with a handwheel, is mounted in snap-in or push-in bearings.

In one form thereof, the present invention provides an adjustably mounted spray nozzle for windshield washer fluid of a motor vehicle, characterized by having a bearing axis by means of which it can be attached to a vehicle in a manner that enables it to pivot about a y-axis of a vehicle, the spray nozzle provided with an adjusting-means element for pivoting about its bearing axis, and the adjusting-means element designed to cooperate with an adjusting-drive manipulator.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
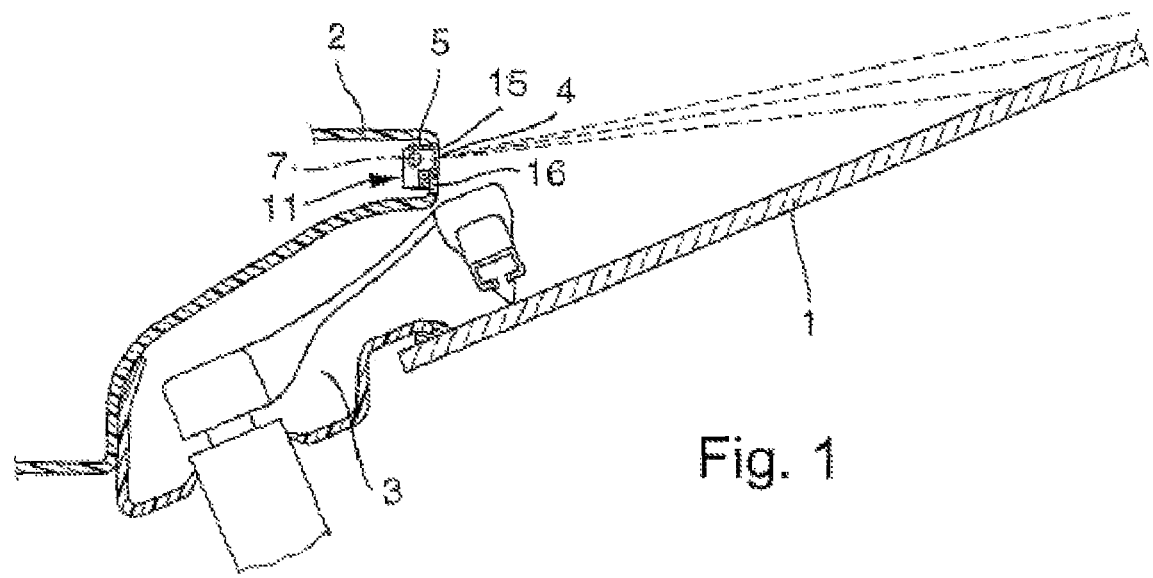
FIG. 1 is a longitudinal section through the region of the vehicle located in front of the vehicle windshield, in cutaway.
Figure 2:
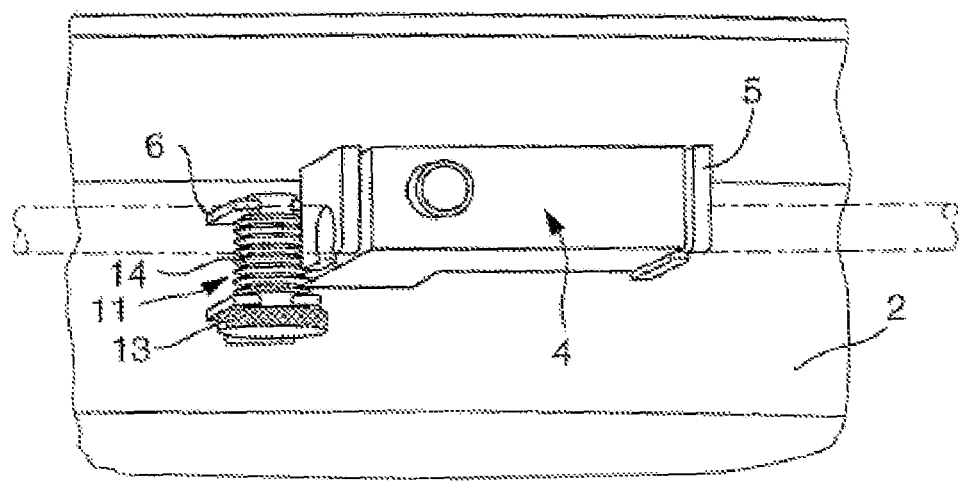
FIG. 2 is a view of a spray nozzle as depicted in FIG. 1, pivotably mounted in a fairing element disposed in front of and in spaced relation to the windshield.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Disposed in front of a windshield 1, in the lower region thereof, is a channel 3 that is open to the windshield 1 and is bounded anteriorly by an inwardly hollow fairing element 2. A spray nozzle 4 for windshield washer fluid is pivotably mounted in the upper inner region of the fairing part 2, within a y-axis of the vehicle. The fairing element 2 serves as the receiving element for spray nozzle 4.

Figure 3:
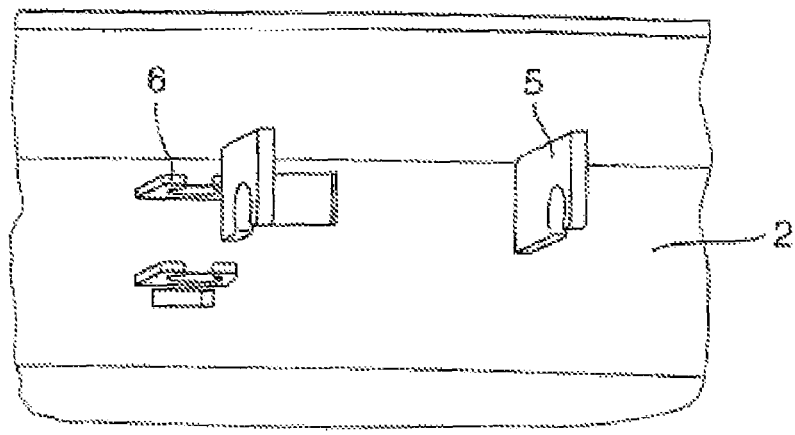
FIG. 3 is a view of the mounting elements inside the fairing part with the spray nozzle not yet installed.

The bearing elements for mounting spray nozzle 4, which are integrated into fairing part 2, can best be seen in FIG. 3. According to that figure, said bearing elements are each configured as webs 5 and 6. These webs 5, 6 contain keyway-shaped openings, the keyways each having a circular profile. The keyway openings of these webs 5 and 6 each have a gap width that can be expanded by elastic deformation of the keyway-equipped webs.

Figure 4:
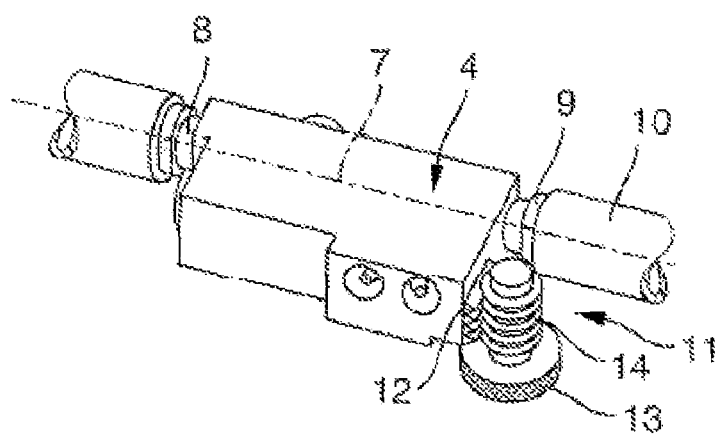
FIG. 4 is a view of a spray nozzle not yet installed, with supply lines connected and the complete adjusting drive.
Figure 5:
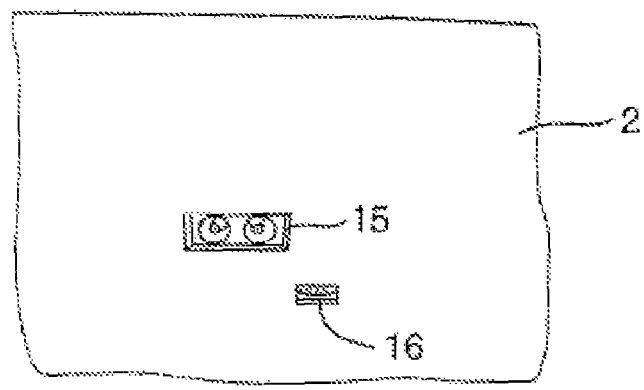
FIG. 5 is a view of the fairing element in the region of the openings leading to the spray nozzle, looking outward from the windshield.

The spray nozzle 4, whose configuration can best be understood from FIG. 4, has a bearing axis 7 with two pivot pins 8 forming the ends thereof.

The pivot pins 8 terminate axially outwardly in connecting pieces 9, to each of which a washer fluid supply line 10 can be connected. The spray nozzle 4 can be snapped into the webs 5 via the pivot pins 8. In the snapped-in state, spray nozzle 4 is able to pivot about its bearing axis 7.

Spray nozzle 4 is made to pivot by means of an adjusting drive 11, implemented in the present exemplary embodiment as a threaded spindle drive. To itemize the structure, threaded spindle adjusting drive 11 is composed of a grooved abutment 12, which is fixedly connected to spray nozzle 4 or is formed directly thereon, and a threaded spindle 14, provided with a handwheel 13 and pivotably mounted in the webs 6 of fairing element 2. Just as spray nozzle 4 is mounted in webs 5 by snap locking, threaded spindle 14 is also snapped into the webs 6 of fairing element 2. The spray jets generated in spray nozzle 4 are able to pass through fairing element 2 via an opening 15 provided therein. The handwheel 13 of threaded spindle 14 is assigned to an additional opening 16 provided in fairing part 2 and accessible from outside the channel 3, and can be operated through said opening 16.

A spray nozzle 4 implemented and mounted according to the invention can be preassembled in a simple manner during vehicle assembly, and after such preassembly needs only to be finely calibrated by means of the handwheel 13 of adjusting drive 11.

All of the features set forth in the description and in the following claims can be essential to the invention, both individually and together in any form.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. In combination:
a motor vehicle having a housing, said housing including a first opening providing access to an interior of said housing;
a spray nozzle body disposed substantially entirely within said interior of said housing, said spray nozzle body having a bearing axis about which said spray nozzle body is rotatable, said spray nozzle body further including a spray nozzle outlet aligned with said first opening;
an adjusting drive manipulator adapted to rotate said spray nozzle body about said bearing axis, said adjusting drive manipulator including a threaded spindle and a manually rotatable handwheel, said threaded spindle disposed within said interior of said housing; and
an adjusting element, said adjusting element comprising a grooved abutment on said spray nozzle body, said threaded spindle engaging said grooved abutment.

2. The combination of claim 1, wherein said housing further comprises a receiving element, said spray nozzle body mountable to said receiving element via a snap-fit engagement.

3. The combination of claim 2, wherein said receiving element comprises a plurality of snap-lock webs pivotally receiving said spray nozzle body.

4. The combination of claim 1, wherein said housing further comprises a receiving element, said adjusting drive manipulator mountable to said receiving element via a snap-fit engagement.

5. The combination of claim 4, wherein said receiving element comprises a plurality of snap-lock webs rotatably receiving said adjusting drive manipulator.

6. The combination of claim 1, wherein said spray nozzle body includes at least one washer fluid input element by which washer fluid may be fed into said spray nozzle body.

7. The combination of claim 1, wherein said housing comprises a second opening, at least a portion of said manually manually-rotatable handwheel disposed within said second opening and acessible externally of said housing.

8. In combination:
a motor vehicle having a housing;
a spray nozzle body including a pair of pivot pins together defining a bearin axis about which said spray nozzle body is rotatable, said pivot pins rotatably mounted to said housing; and
an adjusting drive manipulator adapted to rotate said spray nozzle body about said bearing axis, said adjusting drive manipulator including a threaded spindle including a manually-rotatable handwheel; and
an adjusting element, said adjusting element comprising a grooved abutment on said spray nozzle body, said threaded spindle engaging said grooved abutment.

9. The combination of claim 8, wherein said housing further comprises a receiving element, said spray nozzle body mountable to said receiving element via a snap-fit engagement.

10. The combination of claim 9, wherein said receiving element comprises a pair of snap-lock webs respectively receiving said pivot pins of said spray nozzle body.

11. The combination of claim 8, wherein said housing further comprises a receiving element, said adjusting drive manipulator mountable to said receiving element via a snap-fit engagement.

12. The combination of claim 11, wherein said receiving element comprises a plurality of snap-lock webs rotatably receiving said adjusting drive manipulator.

13. The combination of claim 8, wherein said spray nozzle body includes at least one washer fluid input element by which washer fluid may be fed into said spray nozzle body.

14. The combination of claim 8, wherein said housing comprises an opening, at least a portion of said manually manually-rotatable handwheel disposed within said opening and acessible externally of said housing.

* * * * *